United States Patent
Lee et al.

(10) Patent No.: US 8,300,088 B2
(45) Date of Patent: Oct. 30, 2012

(54) THREE DIMENSIONAL IMAGE SENSOR

(75) Inventors: Seung-hoon Lee, Seoul (KR); Eric R. Fossum, Wolfeboro, NH (US); Yoon-dong Park, Yongin-si (KR); Kyoung-lae Cho, Yongin-si (KR); Sung-jae Byun, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 443 days.

(21) Appl. No.: 12/585,745

(22) Filed: Sep. 23, 2009

(65) Prior Publication Data

US 2010/0073462 A1    Mar. 25, 2010

(30) Foreign Application Priority Data

Sep. 25, 2008    (KR) .................. 10-2008-0094265

(51) Int. Cl.
*H04N 13/02* (2006.01)
*H04N 13/00* (2006.01)
*H04N 3/14* (2006.01)
(52) U.S. Cl. .................. 348/46; 348/42; 348/294
(58) Field of Classification Search ............ 348/46; 356/4.01, 5.01
See application file for complete search history.

(56) References Cited

U.S. PATENT DOCUMENTS

| 6,714,247 | B1 | 3/2004 | Numazaki et al. |
| 7,375,803 | B1* | 5/2008 | Bamji .................. 356/4.01 |
| 2006/0192938 | A1* | 8/2006 | Kawahito ............. 356/5.03 |
| 2006/0214121 | A1* | 9/2006 | Schrey et al. ......... 250/559.38 |
| 2008/0266431 | A1* | 10/2008 | Ohyama et al. ......... 348/294 |

FOREIGN PATENT DOCUMENTS

| JP | 11-265241 A | 9/1999 |
| JP | 2003-185412 A | 7/2003 |
| JP | 2005-175391 A | 6/2005 |
| JP | 2005-175392 A | 6/2005 |

* cited by examiner

*Primary Examiner* — Joseph Ustaris
*Assistant Examiner* — On S Mung
(74) *Attorney, Agent, or Firm* — Lee & Morse, P.C.

(57) ABSTRACT

A three-dimensional (3D) image sensor includes a plurality of color pixels, and a plurality of distance measuring pixels. Where the plurality of color pixels and the plurality of distance measuring pixels are arranged in an array, and a group of distance measuring pixels, from among the plurality of distance measuring pixels, are disposed so that a corner of each distance measuring pixel in the group of distance-measuring pixels is adjacent to a corner of an adjacent distance-measuring pixel in the group of distance-measuring pixels. The group of distance measuring pixels is capable of jointly outputting one distance measurement signal.

20 Claims, 8 Drawing Sheets

THREE DIMENSIONAL IMAGE SENSOR

BACKGROUND

1. Field

Example embodiments are directed to a three-dimensional (3D) image sensor, and more particularly, to a 3D image sensor providing a piece of selective distance measuring information by arranging a plurality of distance measurement pixels to be adjacent to each other.

2. Description of the Related Art

Three-dimensional (3D) sensors are for three-dimensionally reproducing objects by recording color images of the objects and measuring distances among the objects. In order to reproduce the objects, the 3D image sensor may include a combination of color image pixels and distance measuring pixels. The color image pixels may further include red pixels, green pixels, and blue pixels. The color image pixels and the distance measuring pixels may be arranged in arrays.

The distance measuring pixels that measure intensity of infrared (IR) light may have lower sensitivity to light than the color pixels. Therefore, a distance measuring pixel may have a larger area than a color pixel in order to compensate for the lower sensitivity to light. However, the resolution of the color pixel may be degraded as the area of the distance measuring pixel increases.

Moreover, when the size of the distance measuring pixel is reduced, a signal-to-noise ratio may also be reduced. This reduction in the signal-to-noise ratio may make it difficult to obtain accurate information relating to the distance of the objects. In addition, as an illuminance of the object is reduced, the sensitivity of the distance measuring pixels may not be sufficient. This may also make it difficult to obtain accurate distance information regarding the objects.

SUMMARY

Example embodiments are directed to a three-dimensional image sensor selectively using a plurality of distance measuring pixels as one distance measuring pixel according to an illuminance of an object, which substantially overcome one or more of the problems due to the limitations and disadvantages of the related art.

It is another feature of an exemplary embodiment to provide a three-dimensional image sensing system that provides a means for selectively using a plurality of distance measuring pixels as one distance measuring pixel based on an illuminance of an object, which also substantially overcomes one or more of the problems due to the limitations and disadvantages of the related art.

Additional aspects will be set forth in part in the description which follows and, in part, will be apparent from the description. Additional aspects of the 3D image sensor and sensing system may also be learned by practice.

At least one of the above and other features and advantages may be realized by providing a three-dimensional (3D) image sensor that includes a plurality of color pixels and a plurality of distance measuring pixels. The plurality of color pixels and the plurality of distance measuring pixels may be arranged in an array, and a group of distance measuring pixels, from among the plurality of distance measuring pixels, may be disposed so that a corner of each distance measuring pixel in the group of distance measuring pixels is adjacent to a corner of an adjacent distance measuring pixel in the group of distance-measuring pixels, and the group of distance measuring pixels may be capable of jointly outputting one distance measurement signal.

The 3D image sensor may have the color pixels arranged so a corner of each color pixel is adjacent to a corner of an adjacent color pixel. Moreover, each distance measuring pixel may be the same size as each color pixel. Furthermore, the group of distance measuring pixels may have four distance measuring pixels including a first distance measuring pixel having a first corner adjacent with a corner of a second distance measuring pixel, a second corner adjacent with a corner of a third distance measuring pixel, and a third corner adjacent with a corner of a fourth distance measuring pixel.

The group of distance measuring pixels in the 3D image sensor may include a first integrated output line connected to first signal output lines, connected in parallel to each other, of the group of distance measuring pixels, a second integrated output line connected to second signal output lines, connected in parallel to each other, of the group of distance measuring pixels, and a switching device installed between each first signal output line and the first integrated output line, and between each second signal output line and the second integrated output line. Where the switching devices may each selectively connect the corresponding first and second signal output lines to the respective first and second integrated output lines. Furthermore, the switching devices may be selection transistors.

The 3D image sensor may further include a signal controller connected to the first and the second integrated output lines. Where, when an output signal from the first or the second integrated output line is equal to or below a first value, the signal controller outputs one integrated signal as a signal for each group of distance measuring pixels by turning on the switching devices connected to the first integrated output line simultaneously and by turning on the second integrated output line simultaneously in phase difference to the switching devices connected to the first integrated output line. Moreover, when the output signal is above the first value, the signal controller sequentially outputs signals for each of the plurality of distance measuring pixels by sequentially turning on the switching devices for each of the plurality of distance measuring pixels, in phase difference.

The 3D image sensor may further include an illuminometer that measures intensity of illuminance of an object, and a signal controller connected to the first and the second integrated output lines. Where, when the intensity of the illuminance is equal to or below a first value, the signal controller outputs one integrated signal as a signal for each group of distance measuring pixels by turning on the switching devices connected to the first integrated output line simultaneously and by turning on the second integrated output line simultaneously in phase difference to the switching devices connected to the first integrated output line. Moreover, when the intensity of the illuminance is above the first value, the signal controller sequentially outputs signals for each of the plurality of distance measuring pixels by sequentially turning on the switching devices for each of the plurality of distance measuring pixels, in phase difference.

The 3D image sensor may also include a color pixel row driver and a distance measuring pixel row driver. Where the color pixel row driver and the distance measuring pixel row driver may be disposed on opposing sides of the array. Moreover, a first analog signal processor may be connected to column output lines of the color pixels and a second analog signal processor connected to column output lines of the distance measuring pixels. Where the first and second analog signal processors may be disposed on opposing sides of the array.

Each group of the distance measuring pixels of the 3D image sensor may include a first transfer transistor and a second transfer transistor, where a first end of the first transfer transistor is connected to a first side of a corresponding photodiode, and a first end of the second transfer transistor is connected to a second side of the corresponding photodiode. Furthermore, the group of distance measuring pixels may include a first floating diffusion region and a second floating diffusion region that are connected to second ends of the first and second transfer transistors, which are arranged in parallel, and first switching devices disposed between the first floating diffusion region and the corresponding photodiode, and second switching devices disposed between the second floating diffusion region and the corresponding photodiode. Where the first and second switching devices may select transfer of a signal from the photodiodes to the first or the second floating diffusion region according to an operation of the respective first or the second transfer transistor. Moreover, the first floating diffusion region may be connected to a first reset transistor and to a gate of a first drive transistor, the second floating diffusion region may be connected to a second reset transistor and to a gate of a second drive transistor, and the first and second drive transistors may transmit signals from the first and second floating diffusion regions to first and second integrated output lines via first and second selection transistors, respectively.

Each color pixel of the plurality of the color pixels may include at least two different pixels selected from a red pixel, a green pixel, a blue pixel, a magenta pixel, a cyan pixel, a yellow pixel, and a white pixel.

At least one of the above and other features and advantages may also be realized by providing a three-dimensional (3D) imaging sensing system that includes a plurality of color pixels and a plurality of distance measuring pixels arranged in an array. The system may include a group of distance measuring pixels, from among the plurality of distance measuring pixels, jointly outputting one distance measurement signal. The group of distance measuring pixels may ve disposed so that a corner of each distance measuring pixel in the group of distance measuring pixels is adjacent to a corner of an adjacent distance-measuring pixel in the group of distance-measuring pixels.

At least one of the above and other features and advantages may also be realized by providing a three-dimensional (3D) imaging sensing system that includes a plurality of color pixels and a plurality of distance measuring pixels arranged in an array. The system also may include a group of distance measuring pixels, from among the plurality of distance measuring pixels, jointly outputting one distance measurement signal. The group of distance measuring pixels may be disposed so that a corner of each distance measuring pixel in the group of distance measuring pixels is adjacent to a corner of an adjacent distance-measuring pixel in the group of distance-measuring pixels. The system also may include switching devices selectively connecting corresponding first and second signal output lines to respective first and second integrated output lines of the group of distance measuring pixels. The first integrated output line may be connected to first signal output lines, which are connected in parallel to each other, and the second integrated output line may be connected to second signal output lines, which are connected in parallel to each other. When an output signal from the first or the second integrated output lines is equal to or below a first value, switching devices connected to the first integrated output line are simultaneously turned on to output one integrated signal as a signal for each group of distance measuring pixels and switching devices connected to the second integrated output line are simultaneously turned on in phase difference with the switching devices connected to the first integrated output line, and when the output signal is above the first value, switching devices are sequentially turned on to output signals for each of the plurality of distance measuring pixels.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2008-0094265, filed on Sep. 25, 2008, in the Korean Intellectual Property Office, and entitled: "Three Dimensional Image Sensor," is incorporated by reference herein in its entirety.

Example embodiments will now be described more fully hereinafter with reference to the accompanying drawings; however, they may be embodied in different forms and should not be construed as limited to the embodiments set forth herein. Rather, these exemplary embodiments are provided so that this disclosure will be thorough and complete, and will fully convey the scope of the invention to those skilled in the art.

It will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

Figure 1:
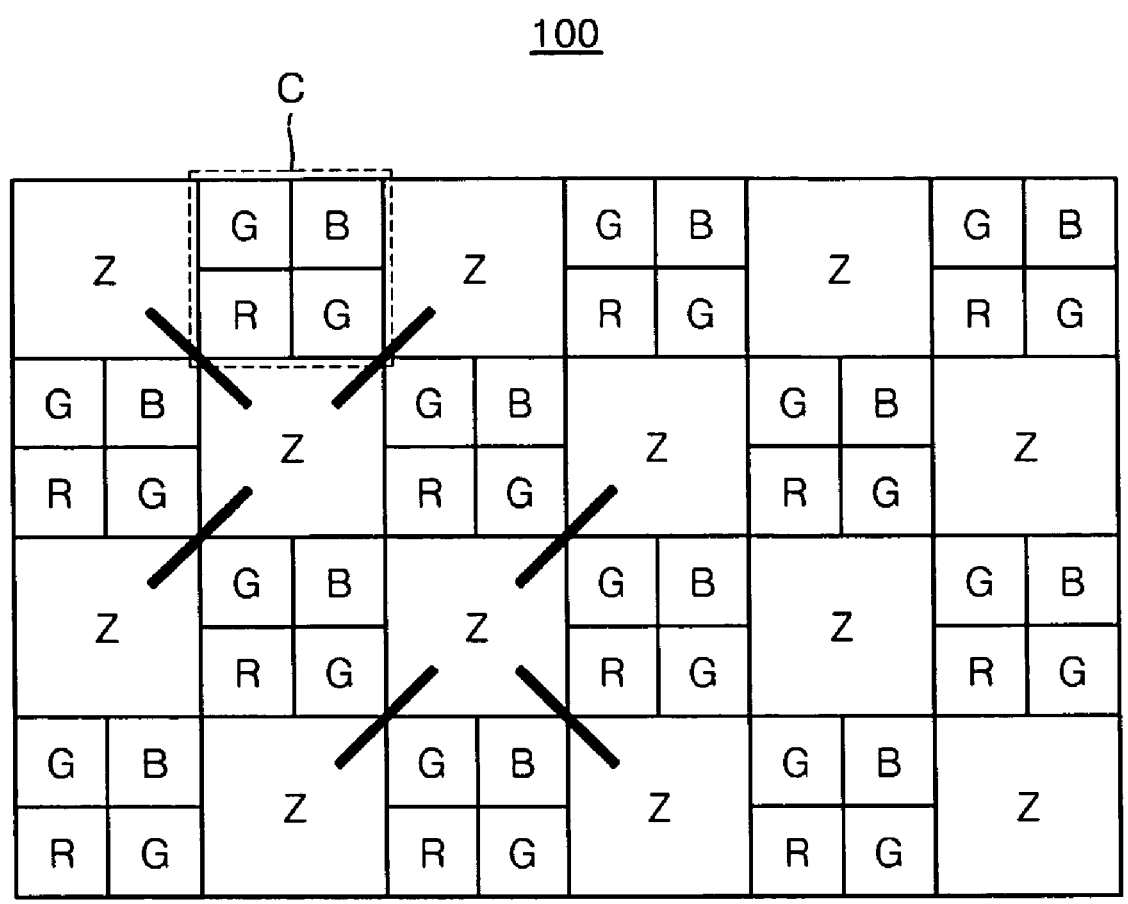
FIG. 1 illustrates a plan view of arrays in a 3D image sensor according to an exemplary embodiment.

FIG. 1 illustrates a plan view of arrays in a 3D image sensor 100 according to an exemplary embodiment. Referring to FIG. 1, the 3D image sensor 100 may include distance measuring pixels Z and color pixels C disposed in an array. As shown in FIG. 1, the color pixels C in the 3D image sensor 100 may include the red pixels R, the green pixels G, and the blue pixels B, but example embodiments are not limited thereto. For example, the color pixels C may include at least two pixels among a red pixel R, a green pixel G, a blue pixel B, a magenta pixel Mg, a cyan pixel Cy, a yellow pixel Y, and a white pixel W. Further, the color pixel C may include more than one of the same pixel type associated therewith, e.g., two green pixels G, as illustrated in FIG. 1. Alternatively, when three different colors are used, a fourth pixel may be a white pixel. As a further alternative, each color pixel C may include four different pixels, e.g., a green pixel G, a magenta pixel Mg, a cyan pixel Cy, and a yellow pixel Y.

Each of the distance measuring pixels Z and each of the color pixels C may be roughly the same size as each other. Moreover, as shown in FIG. 1, the distance measuring pixels Z and the color pixels C may be alternately arranged in the array. The distance measuring pixels Z may be arranged so that at least one corner of each measuring pixel Z contacts a corner of another distance measuring pixel Z. In addition, the color pixels C may also be arranged so that at least one corner of each color pixel C contacts the corner of another color pixel C.

Additionally, four adjacent distance measuring pixels Z may together form a pixel, for example, a super pixel. The super pixel is shown in FIG. 1, as denoted by solid black lines that connect a center distance measuring pixel Z to three separate surrounding distance measuring pixels Z. Each of the plurality of adjacent distance measuring pixels Z may be capable of providing distance measurement information. Additionally, a group of adjacent distance measuring pixels Z, for example the four adjacent pixels shown in FIG. 1, may be capable of jointly providing one distance measuring information by measuring the intensity of infrared (IR) light at four adjacent distance measuring pixels Z. The connection of the plurality of distance measuring pixels Z, for selectively performing distance measurements individually or as a group, is described in further detail below.

FIG. 1 illustrates four adjacent pixels that together may form the super-pixel; however, example embodiments are not limited to this configuration. For example, two, three, or five distance measuring pixels may together form one super-pixel.

Additionally, a filter that selectively transmits a light of a predetermined wavelength, may be positioned on the color pixels C and the distance measuring pixels Z. Moreover, a micro-lens for focusing the light may further be installed on each filter. Furthermore, a photodiode that is capable of measuring the intensity of light passing the filter may be formed under the filter. The exemplary structures of the filter, micro-lens, and photodiode may be regarded as generally well known in the art. Thus, detailed descriptions of these structures are omitted herein.

Figure 2:
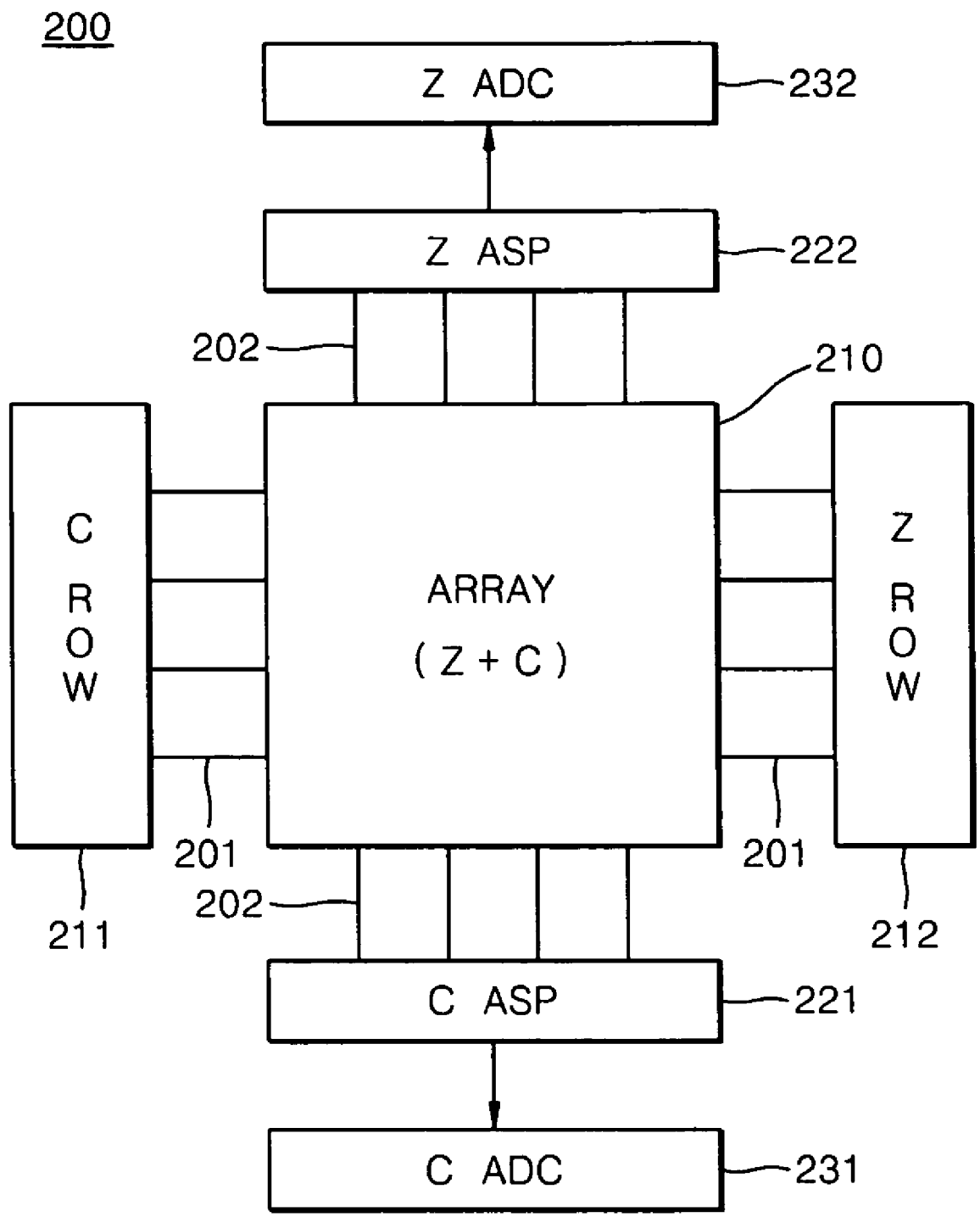
FIG. 2 illustrates a plan view of a configuration of a structure of a 3D image sensor according to an exemplary embodiment.

FIG. 2 illustrates a plan view showing a configuration of a 3D image sensor 200 according to an exemplary embodiment. Referring to FIG. 2, the 3D image sensor 200 includes an array 210 that may include color pixels C and distance measuring pixels Z. Signal input lines 201, as shown in FIG. 2, may be connected to row driver 211 of the color pixels C and row driver 212 of the distance measuring pixels Z. Row drivers 211 and 212 may be separate structures that are arranged at opposite or along different sides of the array 210. For example, as shown in FIG. 2, the row driver 211 of the color pixels C may be disposed on a left side of the array 210, and the row driver 212 of the distance measuring pixel Z may be disposed on a right side of the array 210. Moreover, the color pixel row driver 211 may operate at a frequency of 60 Hz, and the distance measuring pixel row driver 212 may operate at a frequency of 20 MHz.

The 3D image sensor 200 may also include column output lines 202 that are connected to analog signal processor 221 of the color pixel C and analog signal processor 222 of the distance measuring pixel Z. Analog signal processors 221 and 222 may be separate structures that are arranged at opposite or along different sides of the array 210. For example, as shown in FIG. 2, the analog signal processor 222, to which the column output lines 202 of the distance measuring pixel Z may be connected, and an analog-digital converter 232, to which the signal from the analog signal processor 222 may be input, may be disposed on an upper portion of the array 210. The analog signal processor 221, to which the column output lines 202 of the color pixel C may be connected, and an analog-digital converter 231, to which the signal from the analog signal processor 221 may be input, may be disposed on a lower portion the array 210.

In exemplary operating conditions, the color pixel row driver 211 may operate at a frequency of 60 Hz, and the distance measuring pixel row driver 212 may operate at a frequency of 20 MHz. Moreover, digital signals from each of the analog-digital converters 231 and 232 may be input to an image signal processor (not shown). Moreover, in regard to the exemplary embodiment illustrated in FIG. 2, since the signal lines 201 and 202 are separately disposed on both sides of the array 210 (including the color pixel C and the distance measuring pixel Z), a signal-to-noise ratio may be reduced, and a layout of the image sensor may be designed in an easy way.

Figure 3:
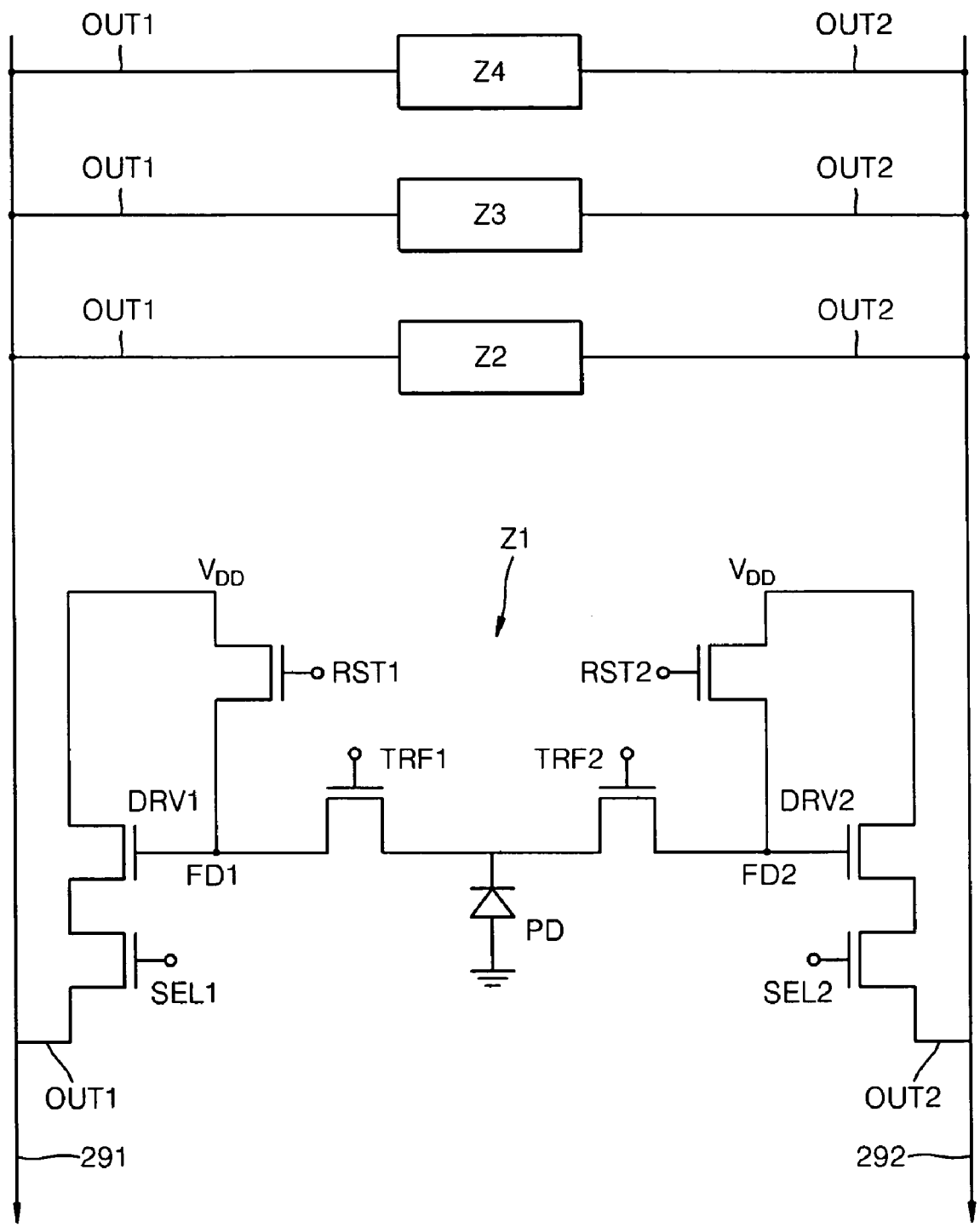
FIG. 3 illustrates a circuit diagram of a distance measuring pixel according to an exemplary embodiment.

FIG. 3 illustrates an equivalent circuit diagram of the distance measuring pixel according to an exemplary embodiment. Like reference numerals denote the same elements throughout the exemplary embodiments, and detailed descriptions may not be repeated for each and every figure.

FIG. 3 illustrates four distance measuring pixels Z1 to Z4, corners of which are adjacent to each other. Each of the four distance measuring pixels Z1 to Z4 may include a photodiode PD, a first circuit and a second circuit, where charges from the photodiode PD having phase differences may be transferred to the first and second circuits.

As shown in FIG. 3, the first circuit may include a transfer transistor TRF1, a reset transistor RST1, a drive transistor DRV1, a selection transistor SEL1, and an output line OUT1. The second circuit may include a transfer transistor TRF2, a reset transistor RST2, a drive transistor DRV2, a selection transistor SEL2, and an output line OUT2. Output lines OUT1 of each of the first to fourth distance measuring pixels Z1 to Z4 may be connected in parallel to a first integrated output line 291, and output lines OUT2 of each of the first to fourth distance measuring pixels Z1-Z4 may be connected in parallel to a second integrated output line 292. The first and second integrated output lines 291 and 292 may correspond to the column output lines 202 of the distance measuring pixel as shown in FIG. 2. Moreover, the signal input line 201 shown in FIG. 2 may be connected to the selection transistors SEL1 and SEL2 of FIG. 3.

In FIG. 3, some components of the second to fourth distance measuring pixels Z2 to Z4 are omitted. However, the components of distance measuring pixels Z2 to Z4 correspond with the components of distance measuring pixel Z1. These components include first and second floating diffusion regions FD1 and FD2 that may be connected to respective gates of the drive transistors DRV1 and DRV2 and the reset transistors RST1 and RST2. Moreover, the drive transistors DRV1 and DRV2 may output the signals from the first and second floating diffusion regions FD1 and FD2 to the first and second integrated output lines 291 and 292 through the selection transistors SEL1 and SEL2, respectively.

Based on the illuminance of an object, each of the distance measuring pixels Z1 to Z4 may be used as a single pixel or as the group of distance measuring pixels that form a super-pixel. That is, when the illuminance of the object is high, the intensity of IR light is high. Therefore, the light intensity may be measured accurately using one distance measuring pixel Z. In contrast, when the illuminance of the object is low, the group of distance measuring pixels Z1 to Z4 may collect the IR light and measure the distance more accurately than a single distance measuring pixel Z. In order to accomplish this, an illuminance determining unit may be required.

The illuminance of the object may be measured from the intensity of the light emitted from the first integrated output line 291 or the second integrated output line 292. According to the measured illuminance, it may be determined whether the a group, i.e. four, distance measuring pixels Z1 to Z4 will be used as one super-pixel or each of the distance measuring pixels Z1 to Z4 will be used separately to measure the distance.

Additionally, a photo gate may be further disposed between the photodiode PD and the transfer transistors TRF1 and TRF2, respectively. The exemplary structure of the photo gate may be regarded as generally well known in the art. Thus, a detailed description of this structure is omitted herein.

Figure 4:
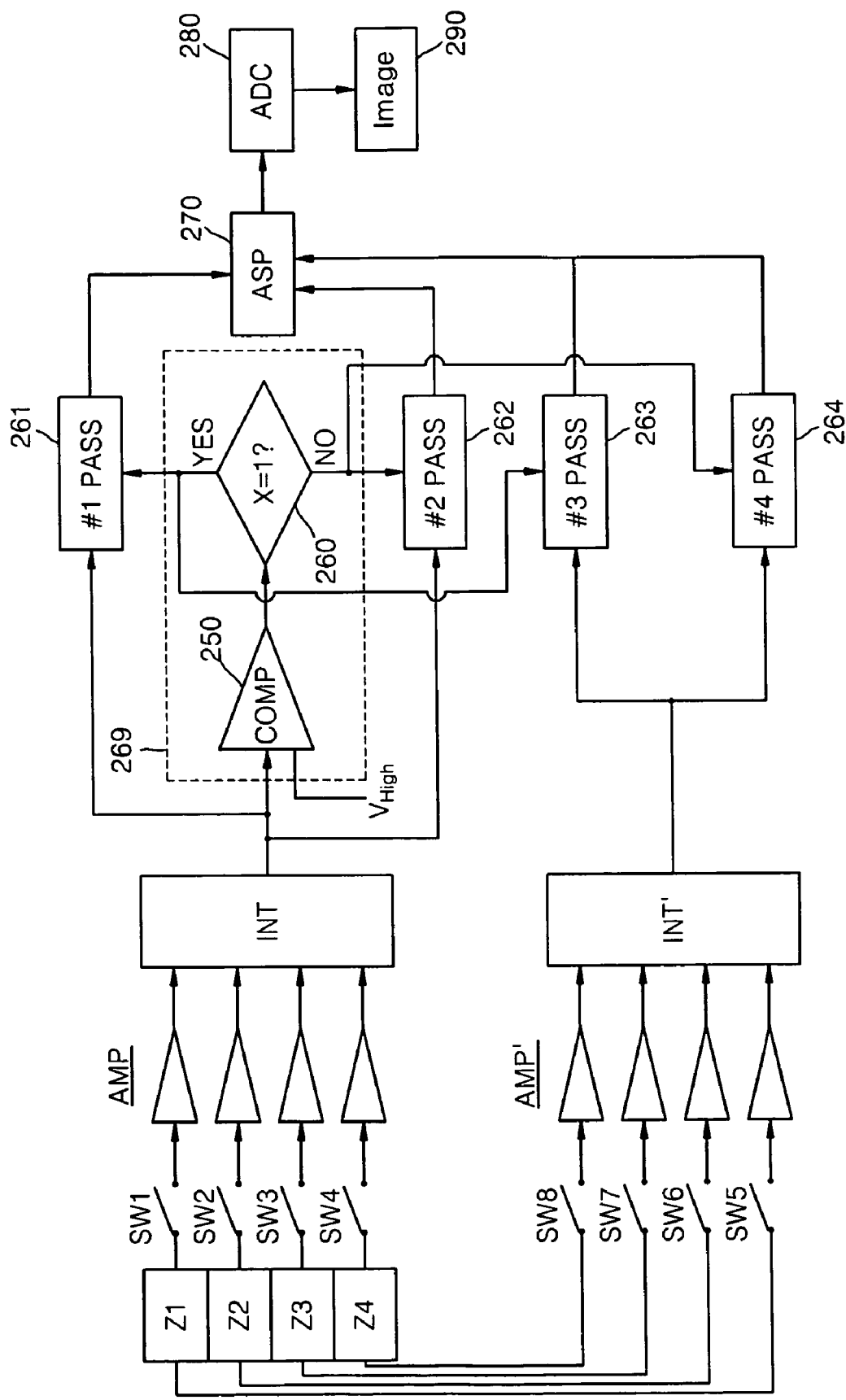
FIG. 4 illustrates a block diagram of a 3D image sensor including the distance measuring pixel shown in FIG. 3 according to an exemplary embodiment.

FIG. 4 illustrates a block diagram of a 3D image sensor including the distance measuring pixels Z1 to Z4 shown in FIG. 3 according to an exemplary embodiment. Referring to FIG. 4, to group of the distance measuring pixels Z1 to Z4, which may form one super-pixel, includes switching devices SW1 to SW4 and amplifiers AMP connected to the first circuit of FIG. 3. The signals output from the amplifiers AMP may be integrated in an integrator INT. Moreover, switching devices SW5 to SW8 and amplifiers AMP' of each distance measuring pixels Z1 to Z4 may be connected to the second circuit of FIG. 3. The signals output from the amplifiers AMP' may be integrated in an integrator INT'.

A signal output from the integrator INT may be input to a first pass gate 261 and a second pass gate 262. A signal output from the integrator INT' may be input to a third pass gate 263 and a fourth pass gate 264. Signals output from the first to fourth pass gates 261 to 264 may be input into an analog signal processor 270, an analog-digital converter 280, and an image processor 290.

The first to fourth switching devices SW1 to SW4 may be the selection transistors SEL1 of the first to fourth distance measuring pixels Z1 to Z4, and the fifth to eighth switching devices SW5 to SW8 may be second selection transistors SEL2 of the first to fourth distance measuring pixels Z1 to Z4. Otherwise, the first to eighth switching devices SW1 to SW8 may be additional switches (not shown) respectively installed between the selection transistors SEL1 and SEL2 and the first and second integrated output lines 291 and 292.

The integrators INT and INT' shown in FIG. 4 may be the first and second integrated output lines 291 and 292, respectively. The amplifiers AMP and AMP' of FIG. 4 may be composed of corresponding the drive transistors DRV1 and DRV2 and the corresponding selection transistors SEL1 and SEL2, respectively.

The illuminance determining unit may be formed on the first integrated output line, as an example. Referring to FIG. 4, when the switching devices SW1 to SW4 are turned on, the signals output from the distance measuring pixels Z1 to Z4 are integrated to the integrator INT. A signal output from the integrator INT may be input into a comparator 250, and a signal output from the comparator 250 may be input into a determiner 260. The comparator 250 and the determiner 260 may together form a signal controller 269, and the signal controller 269 may select a signal that will be input into the analog signal processor 270 according to the illuminance of the object.

In order to select the signal according to the illuminance of the object, the comparator 250 may compare the input signal with a reference value $V_{High}$. When the input signal is less than or equal to the reference value $V_{High}$, the comparator 250 may output a signal "1" to the determiner 260. When the input signal is not less than the reference value $V_{High}$, the comparator 250 may output a signal "0" to the determiner 260. Furthermore, in an exemplary embodiment shown in FIG. 4, the determiner 260 opens the first pass gate 261 and the third pass gate 263 when the input signal is "1", and opens the second pass gate 262 and the fourth pass gate 264 when the input signal is "0".

Referring to the exemplary embodiment shown in FIG. 4, when the signal is "1", the illuminance of the object may be comparatively low. Therefore, an integrated analog signal may be input into the first pass gate 261 from the integrator INT, and then input into the analog signal processor 270. An integrated analog signal may be input into the third pass gate 263 from the integrator INT', and then, input into the analog signal processor 270. According to this embodiment, the first to fourth switching devices SW1 to SW4 may be simultaneously turned on, and the fifth to eighth switching devices SW5 to SW8 may be simultaneously turned on in a phase difference with the first to fourth switching devices SW1 to SW4. Accordingly, two signals having a phase difference therebetween may be input into the analog signal processor 270 from the first to fourth distance measuring pixels Z1 to Z4.

When the signal is "0", the illuminance of the object may be comparatively high. Therefore, as shown in FIG. 4, the second pass gate 262 and the fourth pass gate 264 are opened by the determiner 260. The first to fourth switching devices SW1 to SW4 may be sequentially opened and closed so that the signals from the first to fourth distance measuring pixels Z1 to Z4 may be sequentially input into the integrator INT. The fifth to eighth switching devices SW5 to SW8 may be sequentially opened and closed so that the signals from the first to fourth distance measuring pixels Z1 to Z4 are sequentially input into the integrator INT'. The fifth to eighth switching devices SW5 to SW8 may have phase differences with corresponding first to fourth switching devices SW1 to SW4, respectively. Accordingly, two signals having a phase difference output from the integrators INT and INT' may be sequentially input into the analog signal processor 270.

The signals input to the analog signal processor 270 may be converted to digital signals in the analog-digital converter 280. Furthermore, the converted digital signals may then be input into the image signal processor 290. Moreover, a logic for measuring the distance to the object using the signals having phase difference may be considered generally well known in the art. Thus, a detailed description of the logic is omitted herein.

Figure 5:
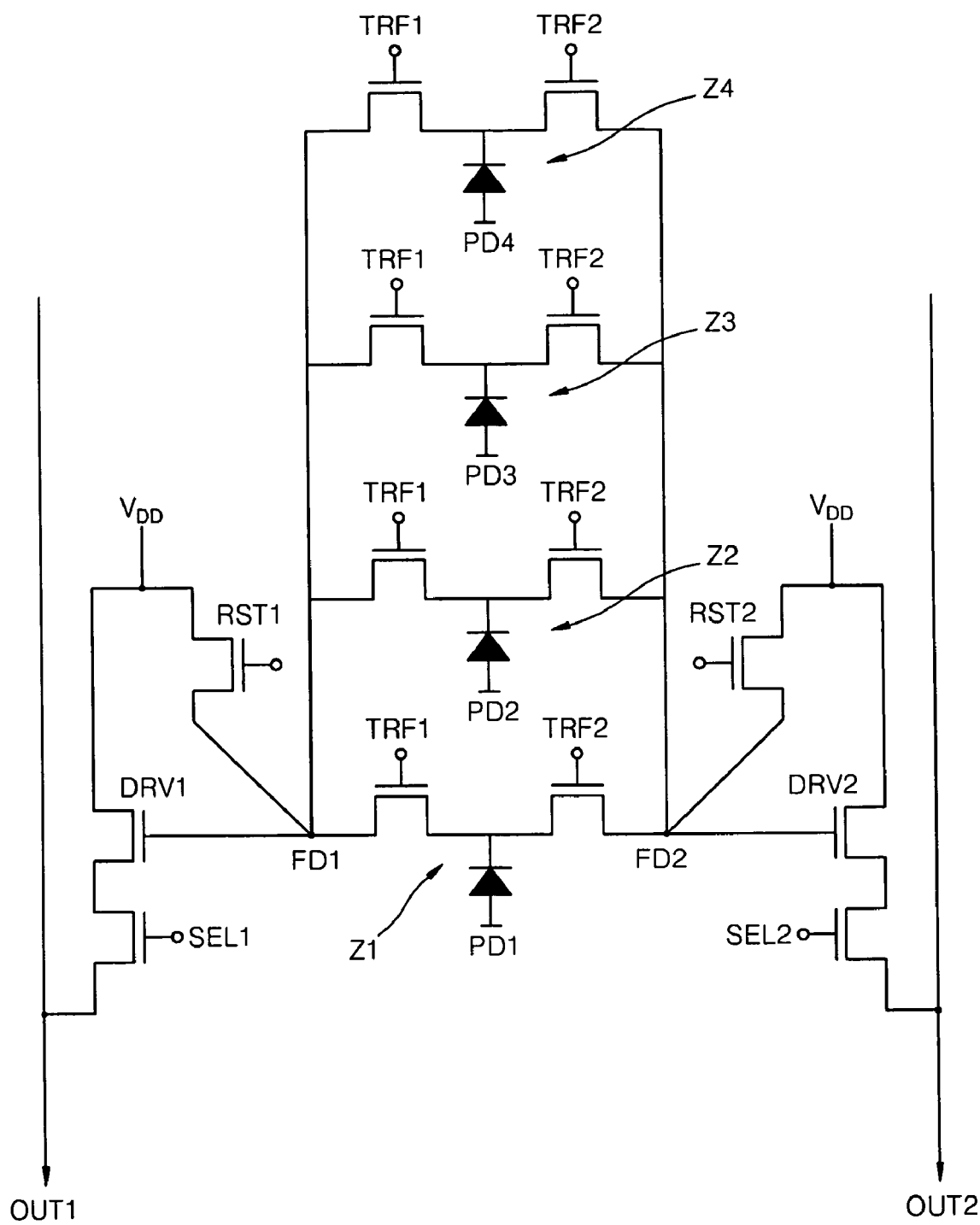
FIG. 5 illustrates a circuit diagram of a distance measuring pixel in a 3D image sensor according to an exemplary embodiment.
Figure 6:
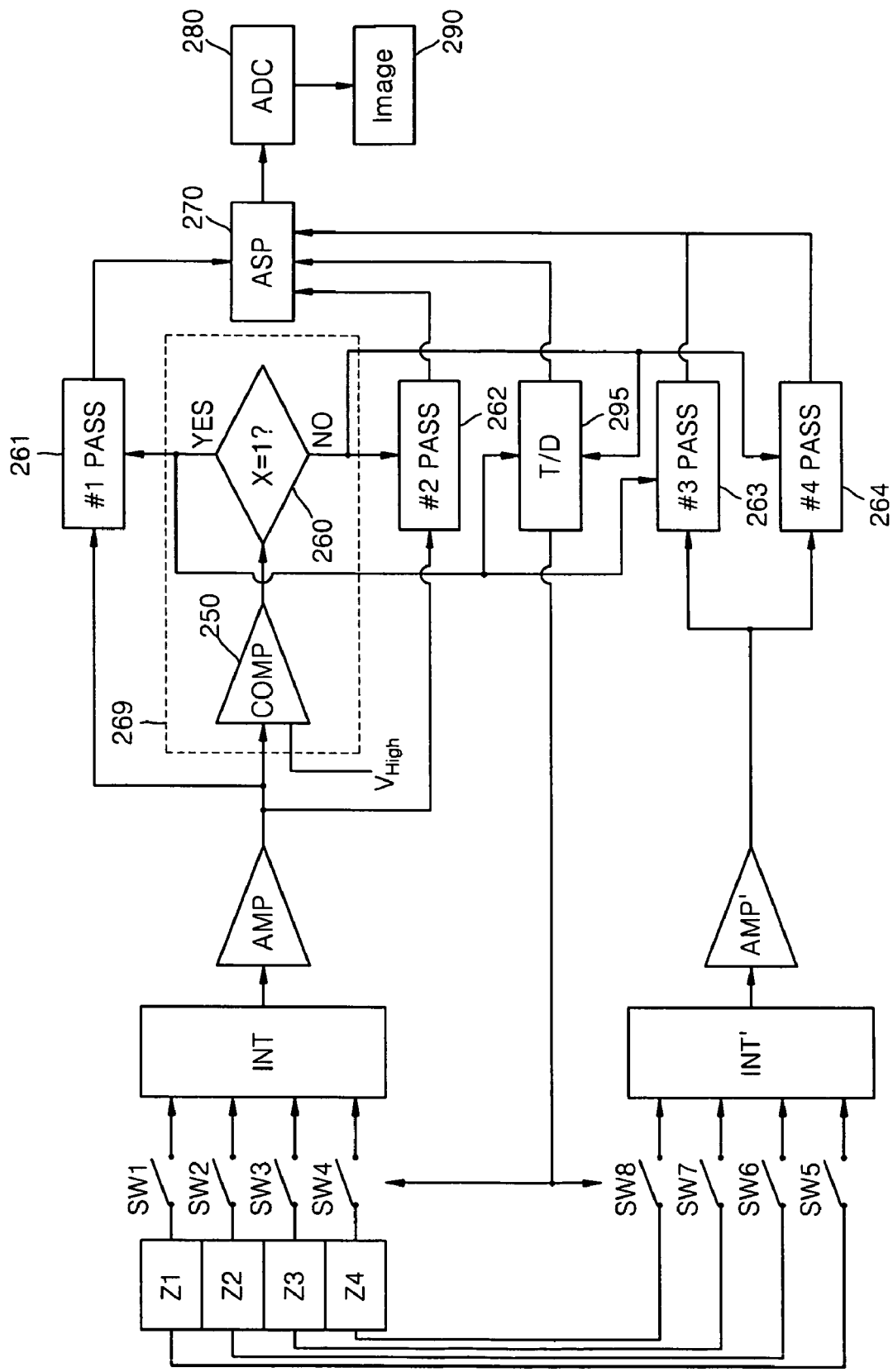
FIG. 6 illustrates a block diagram of a 3D image sensor relating to the distance measuring pixel shown in FIG. 5 according to an exemplary embodiment.

FIG. 5 illustrates an equivalent circuit diagram of distance measuring pixels Z in a 3D image sensor according to an exemplary embodiment. Furthermore, FIG. 6 illustrates a block diagram of a 3D image sensor including the distance measuring pixels Z1 to Z4 shown in FIG. 5. Like reference numerals denote the same elements throughout the exemplary embodiments, and detailed descriptions may not be included for each and every figure. Moreover, the group of distance measuring pixels Z1 to Z4 may share components of the first and second circuits of FIG. 3, except the transfer transistors.

Referring to FIGS. 5 and 6, each of the four shown adjacent distance measuring pixels Z1 to Z4 may include a corresponding photodiode PD1 to PD4, and first and second transfer transistors TRF1 and TRF2. Charges from the corresponding photodiode PD1 to PD4 may be shifted by the phase differences to first and second transfer transistors TRF1 and TRF2. The first transfer transistors TRF1 of the distance measuring pixels Z1 to Z4 may be connected in parallel to a first floating diffusion region FD1, and the second transfer transistors TRF2 of the distance measuring pixels Z1 to Z4 may be connected in parallel to a second floating diffusion region FD2.

The group of four adjacent distance measuring pixels Z1 to Z4 may further include reset transistor RST1 connected to the first floating diffusion region FD1, drive transistor DRV1 having a gate connected to the first floating diffusion region FD1, selection transistor SEL1, reset transistor RST2 connected to the second floating diffusion region FD2, drive transistor DRV2 having a gate connected to the second floating diffusion region FD2, and selection transistor SEL2.

Additionally, photo gates (not shown) may be further disposed between the photodiodes PD1 to PD4 and the corresponding transfer transistors TRF1 and TRF2. The exemplary structure of the photo gate may be regarded as generally well known in the art. Thus, a detailed description of this structure is omitted herein.

Referring to FIG. 6, the switching devices SW1 to SW4, the integrator INT, and the amplifier AMP may be connected to the first circuit of the group of the four adjacent distance measuring pixels Z1 to Z4. In addition, the switching devices SW5 to SW8, the integrator INT', and the amplifier AMP' may be connected to the second circuit of the group of the four adjacent distance measuring pixels Z1 to Z4. Signals output from the first circuit may be integrated to the integrator INT and then input into the amplifier AMP, and signals output from the second circuit may be integrated to the integrator INT' and input into the amplifier AMP'. Therefore, the number of amplifiers is reduced when compared with the number of amplifiers shown in FIG. 4.

The signal output from the integrator INT, through the amplifier AMP, may be input into the first pass gate 261 and the second pass gate 262. The signal output from the integrator INT', through the amplifier AMP', may be input into the third pass gate 263 and the fourth pass gate 264. Moreover, signals output from the first to fourth pass gates 261 to 264 may be input into the analog signal processor 270, pass through the analog-digital converter 280, and pass through the image signal processor 290.

In order to measure the illuminance of the object, the integrator INT or INT' may be used, and in FIG. 6, the illuminance of the object may be determined using the signal from the integrator INT. It may be determined, according to the determination of illuminance, whether the four distance measuring pixels Z1 to Z4 will be used as one super-pixel or each of the four distance measuring pixels Z1 to Z4 will be used separately.

The first to fourth switching devices SW1 to SW4 shown in FIG. 6 may be the first transfer transistors TRF1 of the first to fourth pixels Z1 to Z4, and the fifth to eighth switching devices SW5 to SW8 may be the second transfer transistors TRF2 of the first to fourth pixels Z1 to Z4. In addition, the first to eighth switching devices SW1 to SW8 may be switches (not shown) installed between the transfer transistors TRF1 and TRF2 and the corresponding first and second floating diffusion regions FD1 and FD2. Moreover, each of the amplifiers AMP and AMP' in FIG. 6 may include the corresponding drive transistor DRV1 or DRV2 and the corresponding selection transistor SEL1 or SEL2 of the corresponding pixel.

In order to integrate the signals of the first to fourth distance measuring pixels Z1 to Z4, the first to fourth switching devices SW1 to SW4 may be simultaneously turned on, and then the fifth to eighth switching devices SW5 to SW8 may be simultaneously turned on to have a predetermined phase difference with the first to fourth switching devices SW1 to SW4. In addition, in order to obtain the signals from each of the distance measuring pixels Z1 to Z4, the first to fourth switching devices SW1 to SW4 may be sequentially turned on, and the fifth to eighth switching devices SW5 to SW8 may be sequentially turned on to have phase differences with the corresponding first to fourth switching devices SW1 to SW4.

Additionally, time divider 295 may be included to control the first to eight switching devices SW1 to SW8. The time divider 295 may receive output from the determiner 260, and may control the first to eight switching devices SW1 to SW8 in accordance with an output from the determiner 260. Moreover, the time divider 295 may transmit a synchronization signal to the analog signal processor 270. The synchronization signal may include information about distance measuring pixels Z1 through Z4 from which each signal is transmitted to the analog signal processor 270.

Figure 7:
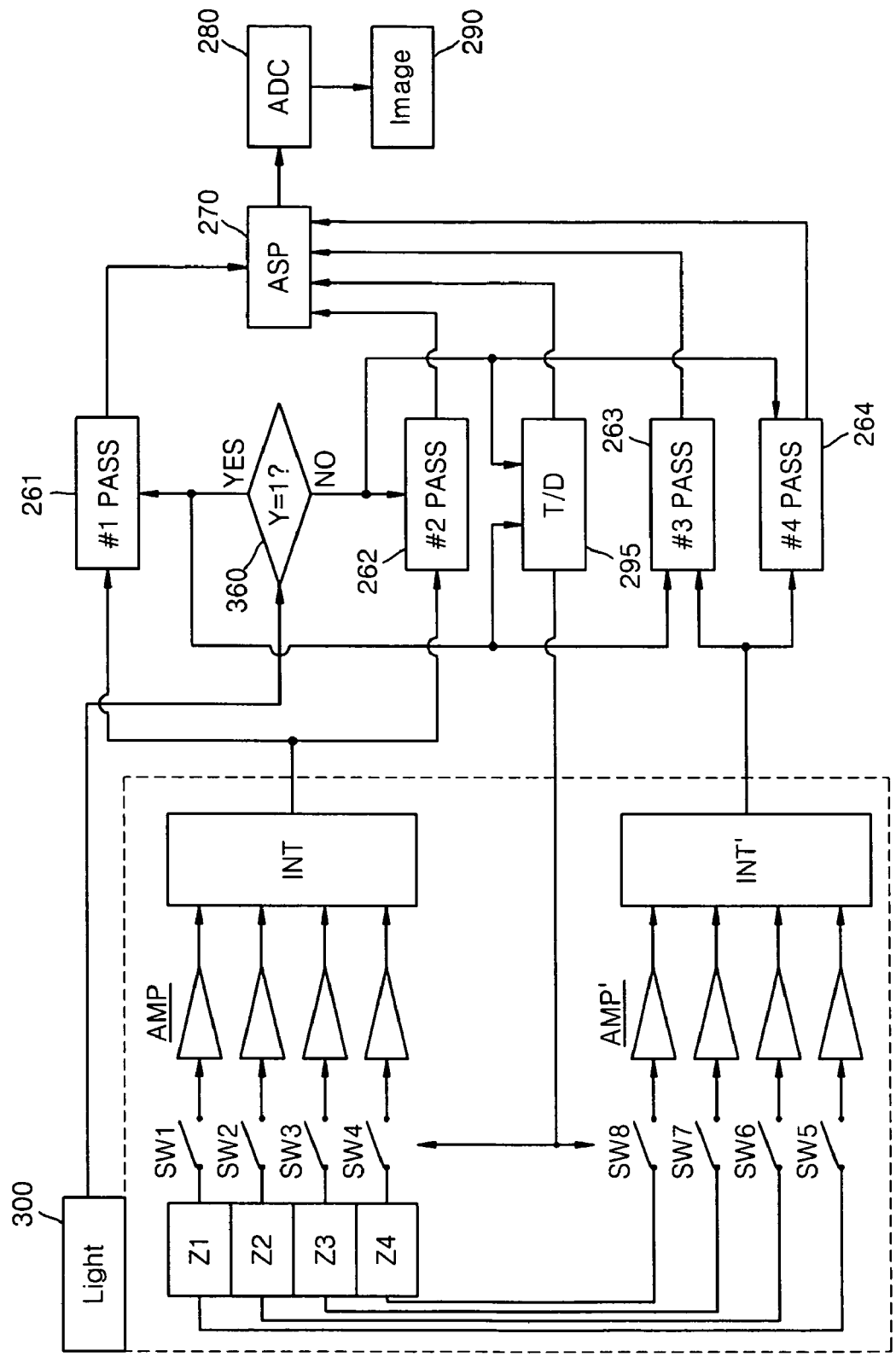
FIG. 7 illustrates a block diagram of a 3D image sensor according to an exemplary embodiment.

FIG. 7 illustrates a block diagram of a 3D image sensor according to an exemplary embodiment. The 3D image sensor of FIG. 7 as compared to the 3D image sensor in FIG. 4 may further include an illuminometer 300 for measuring illuminance of an object instead of the comparator 250, the time divider 295, and a determiner 360 instead of determiner 260. The illuminometer 300 may receive the light from the object and output an electric signal to the determiner 360. When the input signal to the determiner 360 is less than or equal to a predetermined value, the determiner 360 opens the first pass gate 261 and the third pass gate 263.

The 3D image sensor shown in FIG. 7 may further include the time divider 295, which may turn on the first to fourth switching devices SW1 to SW4 simultaneously and turn on the fifth to eighth switching devices SW5 to SW8 simultaneously to have predetermined phase difference with the first to fourth switching devices SW1 to SW4. The time divider 295 may receive output from the determiner 360, and may control the first to eight switching devices SW1 to SW8 in accordance with an output from the determiner 360. Integrated analog signals output from the integrators INT and INT' may be input into the first pass gate 261 and the third pass gate 263, and then, input into the signal processor 270.

Referring to FIG. 7, when it is determined that the input signal to the determiner 360 is greater than a predetermined value, the determiner 360 opens the second pass gate 262 and the fourth pass gate 264. When the second and fourth pass gates 262 and 264 are opened, the time divider 295 may sequentially turn on the first to fourth switching devices SW1 to SW4, and sequentially turn on the fifth to eighth switching devices SW5 to SW8 having phase differences with the corresponding first to fourth switching devices SW1 to SW4. The electric signals of the first to fourth distance measuring pixels Z1 to Z4 may then be sequentially input into the integrators INT and INT'. Thereafter, the signals output from the integrators INT and INT' may be sequentially input into the analog signal processor 270.

Additionally, the time divider 295 may transmit a synchronization signal to the analog signal processor 270. The synchronization signal may include information about distance measuring pixels Z1 through Z4 from which each signal is transmitted to the analog signal processor 270.

Moreover, the signal output from the analog signal processor 270 may be converted to the digital signal in the analog-digital converter 280. Furthermore, the converted digital signal may be input into the image signal processor 290.

Figure 8:
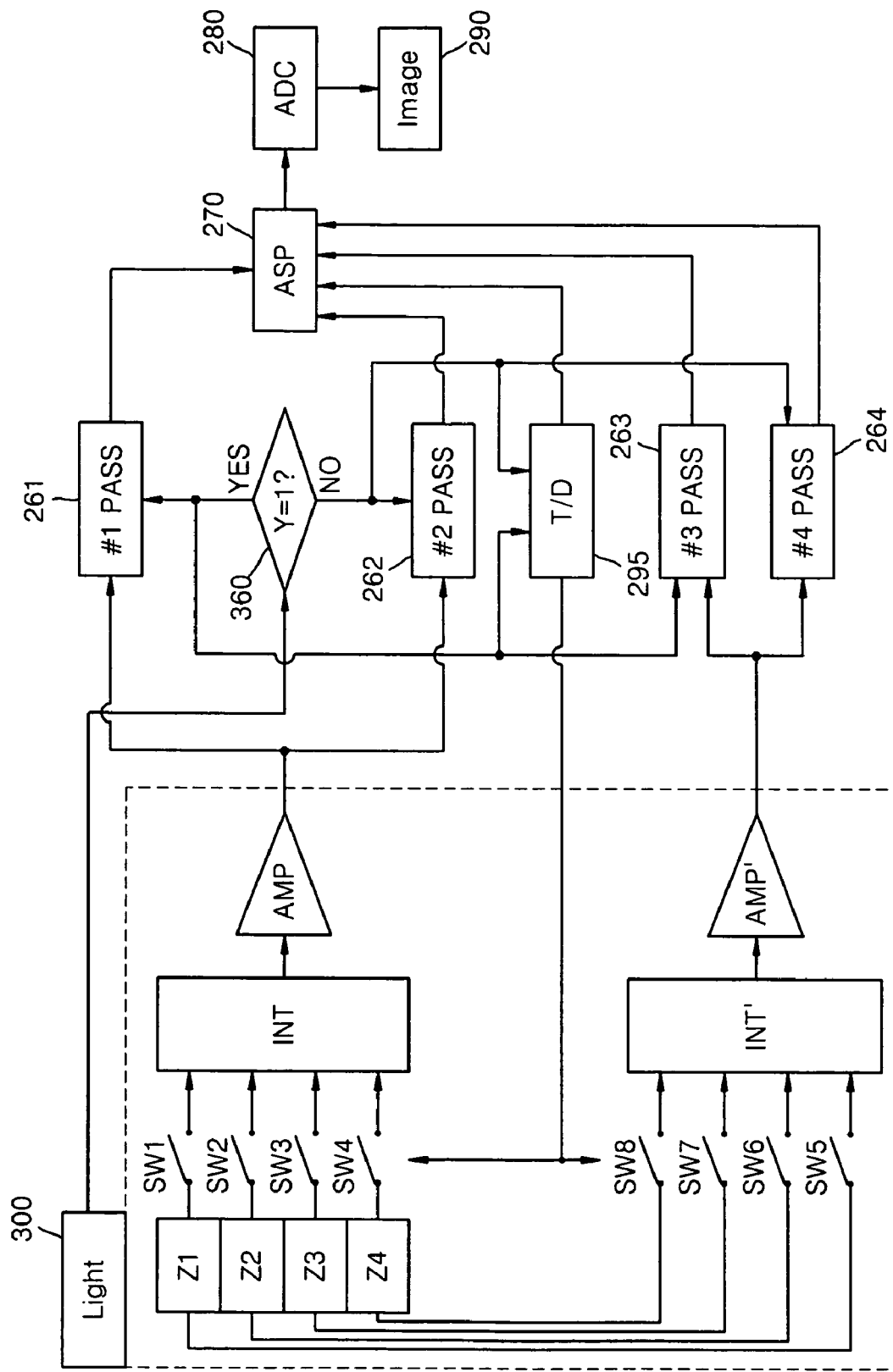
FIG. 8 illustrates a block diagram of a 3D image sensor according to an exemplary embodiment.

FIG. 8 illustrates a block diagram of a 3D image sensor according to an exemplary embodiment. Compared to the 3D image sensor shown in FIG. 6, the 3D image sensor shown in FIG. 8 may further include the illuminometer 300 instead of comparator 250, and the determiner 360 instead of determiner 260. The illuminometer 300 may receive the light from the object and output the electric signal to the determiner 360.

Referring to FIG. 8, when the input signal to the determiner 360 is less than or equal to a predetermined value, the determiner 360 may open the first pass gate 261 and the third pass gate 263. In addition, the time divider 295 may turn on the first to fourth switching devices SW1 to SW4 simultaneously and turn on the fifth to eighth switching devices SW5 to SW8 simultaneously to have predetermined phase differences with the first to fourth switching devices SW1 to SW4. The time divider 295 may receive output from the determiner 360, and may control the first to eight switching devices SW1 to SW8 in accordance with an output from the determiner 360. Integrated analog signals from the integrators INT and INT' may be input into the first pass gate 261 and the third pass gate 263, and then input into the signal processor 270.

When it is determined that the input signal to the determiner 360 is greater than a predetermined value, the determiner 360 may open the second pass gate 262 and the fourth pass gate 264. When the second and fourth pass gates 262 and 264 are opened, the time divider 295 may sequentially turn on the first to fourth switching devices SW1 to SW4, and sequentially turn on the fifth to eighth switching devices SW5 to SW8 having phase differences with the corresponding first to fourth switching devices SW1 to SW4. The electric signals of the first to fourth distance measuring pixels Z1 to Z4 may be sequentially input into the integrators INT and INT'. Thereafter, the signals output from the integrators INT and INT' may be sequentially input into the analog signal processor 270.

The time divider 295 may transmit the synchronization signal to the analog signal processor 270. The synchronization signal may include information about distance measuring pixels Z1 through Z4 from which each signal is transmitted to the analog signal processor 270.

Moreover, the signal output from the analog signal processor 270 may be converted to the digital signal in the analog-digital converter 280. Furthermore, the converted digital signal may be input into the image signal processor 290.

According to the 3D image sensor of example embodiments, based on the illuminance of the object, the distance to the object may be measured using each of the plurality of distance measuring pixels separately or using the group of distance measuring pixels together as one super-pixel. Therefore, the sensitivity of distance measuring pixels may be improved even when the illuminance of the object is low, which may result in a more accurate distance measurement.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A three-dimensional (3D) image sensor comprising:
  a plurality of groups of color pixels, each of the groups of color pixels including a plurality of pixels; and
  a plurality of distance measuring pixels, wherein:
  the plurality of groups of color pixels and the plurality of distance measuring pixels are alternately arranged in an array so that all corners of at least one of the plurality of distance measuring pixels are arranged adjacent to corners of others of the plurality of distance measuring pixels,
  a group of distance measuring pixels, from among the plurality of distance measuring pixels, are arranged so that one corner of each distance measuring pixel in the group of distance measuring pixels is adjacent to another corner of an adjacent distance measuring pixel in the group of distance-measuring pixels, and
  the group of distance measuring pixels is capable of jointly outputting one distance measurement signal.

2. The 3D image sensor as claimed in claim 1, wherein the plurality of pixels in each group of color pixels are arranged so a corner of one of the pixels therein is adjacent to corners of the other pixels therein, each group of color pixels being adjacent to more than one of the distance measuring pixels in the group of distance measuring pixels.

3. The 3D image sensor as claimed in claim 1, wherein each distance measuring pixel is the same size as each group of color pixels.

4. The 3D image sensor as claimed in claim 1, wherein the group of distance measuring pixels includes four distance measuring pixels including a first distance measuring pixel having a first corner adjacent with a corner of a second distance measuring pixel, a second corner adjacent with a corner of a third distance measuring pixel, and a third corner adjacent with a corner of a fourth distance measuring pixel, the first corner being spaced apart from the third and fourth distance measuring pixels, the second corner being spaced apart from the second and fourth distance measuring pixels, and the third corner being spaced apart from the second and third distance measuring pixels.

5. The 3D image sensor as claimed in claim 1, wherein the group of distance measuring pixels includes:
  a first integrated output line connected to first signal output lines that are connected in parallel to each other, each distance measuring pixel in the group of distance measuring pixels corresponding to one of the first signal output lines;
  a second integrated output line connected to second signal output lines that are connected in parallel to each other, each distance measuring pixel in the group of distance measuring pixels corresponding to one of the second signal output lines;

a first switching device between each first signal output line and the first integrated output line; and a second switching device between each second signal output line and the second integrated output line, the first and second switching devices selectively connecting the corresponding first and second signal output lines to the respective first and second integrated output lines.

6. The 3D image sensor as claimed in claim 5, wherein the first and second switching devices are selection transistors for each distance measuring pixel in the group of distance measuring pixels.

7. The 3D image sensor as claimed in claim 5, further comprising:

a signal controller connected to the first and the second integrated output lines, wherein, when an output signal from the first integrated output line is equal to or below a first value, the signal controller outputs one integrated signal as a signal for each group of distance measuring pixels by turning on the first switching device connected to the first integrated output line simultaneously and by turning on the second switching device connected to the second integrated output line simultaneously in phase difference to the first switching device, and when the output signal is above the first value, the signal controller sequentially outputs signals for each of the plurality of distance measuring pixels by sequentially turning on the first and second switching devices for each of the plurality of distance measuring pixels, in phase difference.

8. The 3D image sensor as claimed in claim 5, further comprising:

an illuminometer that measures intensity of illuminance of an object; and a signal controller connected to the first and the second integrated output lines, wherein, when the intensity of the illuminance is equal to or below a first value, the signal controller outputs one integrated signal as a signal for each group of distance measuring pixels by turning on the first switching device connected to the first integrated output line simultaneously and by turning on the second switching device connected to the second integrated output line simultaneously in phase difference to the first switching device, and when the intensity of the illuminance is above the first value, the signal controller sequentially outputs signals for each of the plurality of distance measuring pixels by sequentially turning on the first and second switching devices for each of the plurality of distance measuring pixels, in phase difference.

9. The 3D image sensor as claimed in claim 1, further comprising:

a color pixel row driver and a distance measuring pixel row driver, wherein the color pixel row driver and the distance measuring pixel row driver are disposed on opposing sides of the array.

10. The 3D image sensor as claimed in claim 9, further comprising:

a first analog signal processor connected to column output lines of the groups of color pixels and a second analog signal processor connected to column output lines of the distance measuring pixels, wherein the first and second analog signal processors are disposed on opposing sides of the array.

11. The 3D image sensor as claimed in claim 10, wherein the group of distance measuring pixels includes:

a first integrated output line connected to first signal output lines that are connected in parallel to each other, each distance measuring pixel in the group of distance measuring pixels corresponding to one of the first signal output lines;

a second integrated output line connected to second signal output lines that are connected in parallel to each other, each distance measuring pixel in the group of distance measuring pixels corresponding to one of the second signal output lines; and a switching device installed between each first signal output line and the first integrated output line, and between each second signal output line and the second integrated output line, the switching devices selectively connecting the corresponding first and second signal output lines to the respective first and second integrated output lines.

12. The 3D image sensor as claimed in claim 11, wherein the switching devices are selection transistors.

13. The 3D image sensor as claimed in claim 11, further comprising:

a signal controller connected to the first and the second integrated output lines, wherein, when an output signal from the first integrated output line is equal to or below a first value, the signal controller outputs one integrated signal as a signal for each group of distance measuring pixels by turning on the switching devices connected to the first integrated output line simultaneously and by turning on the second integrated output line simultaneously in phase difference to the switching devices connected to the first integrated output line, and when the output signal is above the first value, the signal controller sequentially outputs signals for each of the plurality of distance measuring pixels by sequentially turning on the switching devices for each of the plurality of distance measuring pixels, in phase difference.

14. The 3D image sensor as claimed in claim 11, further comprising:

an illuminometer that measures intensity of illuminance of an object; and a signal controller connected to the first and the second integrated output lines, wherein, when the intensity of the illuminance is equal to or below a first value, the signal controller outputs one integrated signal as a signal for each group of distance measuring pixels by turning on the switching devices connected to the first integrated output line simultaneously and by turning on the second integrated output line simultaneously in phase difference to the switching devices connected to the first integrated output line, and when the intensity of the illuminance is above the first value, the signal controller sequentially outputs signals for each of the plurality of distance measuring pixels by sequentially turning on the switching devices for each of the plurality of distance measuring pixels, in phase difference.

15. The 3D image sensor as claimed in claim 5, wherein each distance measuring pixels-pixel includes:

a first transfer transistor and a second transfer transistor, wherein a first end of the first transfer transistor is connected to a first side of a corresponding photodiode, and a first end of the second transfer transistor is connected to a second side of the corresponding photodiode; and wherein the group of distance measuring pixels includes:

a first floating diffusion region and a second floating diffusion region that are connected to second ends of the first and second transfer transistors, which are arranged in parallel; and first switching devices disposed between the first floating diffusion region and the corresponding photodiode, and second switching devices disposed between the second floating diffusion region and the corresponding photodiode, the first and second switching devices selecting transfer of a signal from the photodiodes to the first or the second floating diffusion region according to an operation of the respective first or the second transfer transistor, wherein the first floating diffusion region is connected to a first reset transistor and to a gate of a first drive transistor, the second floating diffusion region is connected to a second reset transistor and to a gate of a second drive transistor, and the first and second drive transistors transmit signals from the first and second floating diffusion regions to the first and second integrated output lines via first and second select transistors, respectively.

16. The 3D image sensor as claimed in claim 15, wherein the first and second switching devices are selection transistors for each distance measuring pixel.

17. The 3D image sensor as claimed in claim 15, further comprising:
a signal controller connected to the first and the second integrated output lines, wherein,
when an output signal from the first or the second integrated output line is equal to or below a first value, the signal controller outputs one integrated signal as a signal for each group of distance measuring pixels by turning on switching units connected to the first integrated output line simultaneously and by turning on the second integrated output line simultaneously in phase difference to the switching units connected to the first integrated output line, and
when the output signal is above the first value, the signal controller sequentially outputs signals for each of the plurality of distance measuring pixels by sequentially turning on the switching units for each of the plurality of distance measuring pixels, in phase difference.

18. The 3D image sensor as claimed in claim 15, further comprising:
an illuminometer that measures intensity of illuminance of an object; and
a signal controller connected to the first and the second integrated output lines, wherein,
when the intensity of the illuminance is equal to or below a first value, the signal controller outputs one integrated signal as a signal for each group of distance measuring pixels by turning on switching units connected to the first integrated output line simultaneously and by turning on the second integrated output line simultaneously in phase difference to the switching units connected to the first integrated output line, and
when the intensity of the illuminance is above the first value, the signal controller sequentially outputs signals for each of the plurality of distance measuring pixels by sequentially turning on the switching units of each of the plurality of distance measuring pixels, in phase difference.

19. The 3D image sensor as claimed in claim 3, wherein each group of color includes at least four pixels, the four pixels include at least two different pixels selected from a red pixel, a green pixel, a blue pixel, a magenta pixel, a cyan pixel, a yellow pixel, and a white pixel.

20. The 3D image sensor as claimed in claim 19, wherein:
the groups of color pixels only include pixels for recording an image and the plurality of groups of distance measuring pixels only include pixels for measuring distances,
the groups of color pixels and the plurality of distance measuring pixels are alternately arranged in a plurality of columns and a plurality of rows in the array,
the group of distance measuring pixels is one of a plurality of groups of distance measuring pixels, and
each group of distance measuring pixels includes ones of the distance measuring pixels arranged in different columns of the plurality of columns and different rows of the plurality of rows, the ones of the distance measuring pixels being adjacent to each other in the array.

* * * * *